US011331591B2

(12) United States Patent
Enzenhofer

(10) Patent No.: US 11,331,591 B2
(45) Date of Patent: May 17, 2022

(54) HUMIDITY MANAGEMENT DEVICE, POTABLE WATER GENERATION SYSTEM AND METHOD

(71) Applicant: Matthias Enzenhofer, Heilbronn (DE)

(72) Inventor: Matthias Enzenhofer, Heilbronn (DE)

( * ) Notice: Subject to any disclaimer, the term of this patent is extended or adjusted under 35 U.S.C. 154(b) by 377 days.

(21) Appl. No.: 16/310,204

(22) PCT Filed: Jun. 20, 2017

(86) PCT No.: PCT/EP2017/065091
§ 371 (c)(1),
(2) Date: Dec. 14, 2018

(87) PCT Pub. No.: WO2017/220580
PCT Pub. Date: Dec. 28, 2017

(65) Prior Publication Data
US 2019/0329147 A1    Oct. 31, 2019

(30) Foreign Application Priority Data

Jun. 22, 2016  (SG) .......................... 10201605165X

(51) Int. Cl.
*B01B 1/00* (2006.01)
*C02F 1/04* (2006.01)
*F24F 3/14* (2006.01)

(52) U.S. Cl.
CPC .............. *B01B 1/005* (2013.01); *C02F 1/048* (2013.01); *F24F 3/1411* (2013.01); *C02F 2307/10* (2013.01); *F24F 2003/144* (2013.01)

(58) Field of Classification Search
CPC ...... B01B 1/005; C02F 1/048; C02F 2307/10; F24F 3/1411; F24F 2003/144
(Continued)

(56) References Cited

U.S. PATENT DOCUMENTS 3,060,921 A * 10/1962 Luring .................. B01F 15/063
126/360.2
4,276,124 A * 6/1981 Mock ...................... C02F 1/042
202/236
(Continued)

FOREIGN PATENT DOCUMENTS

DE      10207101     8/2003
GB       2091582     8/1982
(Continued)

*Primary Examiner* — Charles S Bushey
(74) *Attorney, Agent, or Firm* — Alix, Yale & Ristas, LLP

(57) ABSTRACT

A humidity management device and a potable water generation system and method using such a device are provided. The humidity management device includes a chamber having an air inlet disposed adjacent a first end and an air outlet disposed adjacent a second end, and a dispensing mechanism configured to dispense a moisture-regulating substance into a space between the first and second ends. The dispensing mechanism includes a liquid inlet disposed adjacent the second end for supplying a flow of the moisture-regulating substance into the chamber toward the first end and a conveyor configured to transport a portion of the moisture-regulating substance collected adjacent the first end and re-distribute said moisture-regulating substance into the space between the first and second ends. The conveyor includes an Archimedes' screw at least partially enclosed in an elongated sleeve.

9 Claims, 3 Drawing Sheets

(58) Field of Classification Search
USPC .................................. 261/29, 157, 159, 160
See application file for complete search history.

(56) References Cited

U.S. PATENT DOCUMENTS

| | | | |
|---|---|---|---|
| 4,930,322 A | | 6/1990 | Ashley et al. |
| 5,632,864 A | * | 5/1997 | Enneper ................. B01D 1/305 |
| | | | 202/197 |
| 6,083,382 A | * | 7/2000 | Bird ....................... B01D 61/06 |
| | | | 210/96.2 |
| 7,832,714 B2 | * | 11/2010 | Duesel, Jr ............. B01D 5/006 |
| | | | 261/77 |
| 8,647,477 B2 | * | 2/2014 | Govindan ............. B01D 3/346 |
| | | | 203/11 |
| 8,820,723 B1 | | 9/2014 | Sparrow |
| 10,022,651 B2 | * | 7/2018 | Enzenhofer ........ B01D 19/0005 |
| 10,808,949 B2 | * | 10/2020 | Enzenhofer ............ F24F 3/147 |
| 2009/0020481 A1 | | 1/2009 | Bailie |
| 2012/0175237 A1 | * | 7/2012 | Yabe ..................... B01D 3/343 |
| | | | 202/175 |
| 2012/0292176 A1 | | 11/2012 | Machhammer et al. |
| 2015/0075963 A1 | * | 3/2015 | Yabe ........................ C02F 1/04 |
| | | | 202/180 |
| 2016/0296857 A1 | | 10/2016 | Enzenhofer et al. |
| 2017/0233264 A1 | * | 8/2017 | Boylan ..................... C02F 1/10 |
| | | | 203/10 |

FOREIGN PATENT DOCUMENTS

| | | |
|---|---|---|
| JP | 2014503782 | 2/2014 |
| WO | WO 2011/098478 A1 * | 8/2011 |
| WO | WO2012082093 | 6/2012 |
| WO | WO2015063076 | 5/2015 |

* cited by examiner

HUMIDITY MANAGEMENT DEVICE, POTABLE WATER GENERATION SYSTEM AND METHOD

FIELD OF INVENTION

The present invention relates broadly, but not exclusively, to a humidity management device, to a potable water generation system and to a method of generating potable water from raw water.

BACKGROUND

The contact of a gas with a liquid medium can be used, for example, to mix the gas with the liquid medium. In practice, air for example can be moistened to achieve a more pleasant indoor climate. Conversely, humid air can be dehumidified through contact with a liquid sorbent, which can remove moisture from the humid air. Such humidification and dehumidification are typically used in heating, ventilation and air-conditioning (HVAC) or climate control systems to provide air having the desired humidity and/or temperature.

To moisten the air at room temperature sufficiently, a large evaporation surface is typically needed, but this is commonly not available. Further, in order to reprocess and recycle the liquid sorbent, significant amounts of energy may be required, thus reducing the energy efficiency of the system. This can be undesirable in the context of increasing sustainability and climate-change awareness.

Energy consumption is also a concern in the generation of potable water from raw water such as saltwater or brackish water. Desalination systems have been used to generate potable water for consumption and irrigation but such systems are not only expensive and complex to build but also not suitable for operation on a small scale, for example, in remote areas or stand-alone dwellings.

A need therefore exists to provide a device, system and method that may address at least some of the above problems.

SUMMARY

According to a first aspect of the present invention, there is provided a humidity management device comprising:
a chamber having an air inlet disposed adjacent a first end and an air outlet disposed adjacent a second end; and
a dispensing mechanism configured to dispense a moisture-regulating substance into a space between the first and second ends, the dispensing mechanism comprising:
  a liquid inlet disposed adjacent the second end for supplying a flow of the moisture-regulating substance into the chamber toward the first end; and
  a conveyor configured to transport a portion of the moisture-regulating substance collected adjacent the first end and re-distribute said moisture-regulating substance into the space between the first and second ends, the conveyor comprising an Archimedes' screw at least partially enclosed in an elongated sleeve;
wherein the air inlet is configured to receive a flow of input air having a first humidity level; and
wherein the air outlet is configured to draw said input air to contact the moisture-regulating substance to thereby change a moisture content of said input air such that output air exiting the chamber has a second humidity level different from the first humidity level.

The elongated sleeve may have a cylindrical radial surface, the radial surface having a plurality of holes.

The humidity management device may further comprise a plurality of hollow tubes, each tube being attached to a corresponding hole such that the tubes are in fluid communication with the sleeve.

Each of the tubes may comprise a porous surface capable of carrying the moisture-regulating substance.

The dispensing mechanism may be configured to re-distribute the moisture-regulating substance as a liquid film on the porous surface.

The dispensing mechanism may be configured to re-distribute the moisture-regulating substance as a mist in the space between the first and second ends.

The humidity management device may further comprise an actuator coupled to the conveyor to drive the conveyor.

The actuator may further be coupled to the sleeve to rotate the sleeve.

The humidity management device may be operable as a dehumidifier unit, and the moisture-regulating substance may be configured to remove moisture from the input air such that the second humidity level is lower than the first humidity level.

A temperature of the input air may be higher than a temperature of the moisture regulating substance.

The humidity management device may be operable as a humidifier unit, and the moisture-regulating substance may be configured to release moisture into the input air such that the second humidity level is higher than the first humidity level.

A temperature of the input air may be lower than a temperature of the moisture-regulating substance.

According to a second aspect of the present invention, there is provided a potable water generation system comprising:
an evaporator unit; and
a condenser unit in fluid communication with the evaporator unit,
wherein the evaporator unit comprises a chamber having an air inlet disposed adjacent a first end and an air outlet disposed adjacent a second end, and a dispensing mechanism configured to dispense raw water into a space between the first and second ends, the dispensing mechanism comprising:
  a liquid inlet disposed adjacent the second end for supplying a flow of the raw water into the chamber toward the first end; and
  a conveyor configured to transport a portion of the raw water collected adjacent the first end and re-distribute said raw water into the space between the first and second ends, the conveyor comprising an Archimedes' screw at least partially enclosed in an elongated sleeve;
wherein the air inlet is configured to receive a flow of input air having a first humidity level;
wherein the air outlet is configured to draw said input air to contact the raw water to thereby moisten said input air such that output air exiting the chamber has a second humidity level higher than the first humidity level; and
wherein the condenser unit is configured to receive the output air from the evaporator unit and condense water molecules from said output air, to thereby generate potable water.

The condenser may comprise a fixed-bed condenser.

The condenser may comprise a pressurized chamber.

The condenser unit may be further configured to pre-heat cool incoming raw water using the output air from the evaporator unit.

The system may further comprise a heat exchanger configured to receive the incoming raw water from the condenser unit and to further pre-heat the incoming raw water using warm raw water from the evaporator.

The system may further comprise a heater disposed downstream of the heat exchanger and configured to further heat the incoming raw water to a predetermined working temperature prior to the raw water entering the chamber of the evaporator unit.

The working temperature may be in the range of between 50° C. and 70° C.

According to a third aspect of the present invention, there is provided a method for generating potable water from raw water, the method comprising the steps of:

supplying a flow of the raw water into an evaporator unit, the evaporator unit comprising a device as defined in the first aspect;

supplying a flow of input air having a first humidity level into the evaporator unit;

directing the flow of input air to contact the raw water to thereby moisten said input air such that output air exiting the evaporator unit has a second humidity level higher than the first humidity level; and directing the output air from the evaporator unit to a condenser unit to condense water molecules from said output air, to thereby generate potable water.

Supplying the flow of the raw water into the evaporator unit may comprise pre-heating the raw water through heat exchange at the condenser unit with the output air from the evaporator unit and/or at a heat exchanger with warm raw water from the evaporator unit.

BRIEF DESCRIPTION OF THE DRAWINGS

Embodiments of the invention will be better understood and readily apparent to one of ordinary skill in the art from the following written description, by way of example only, and in conjunction with the drawings, in which.

DETAILED DESCRIPTION

Figure 1:
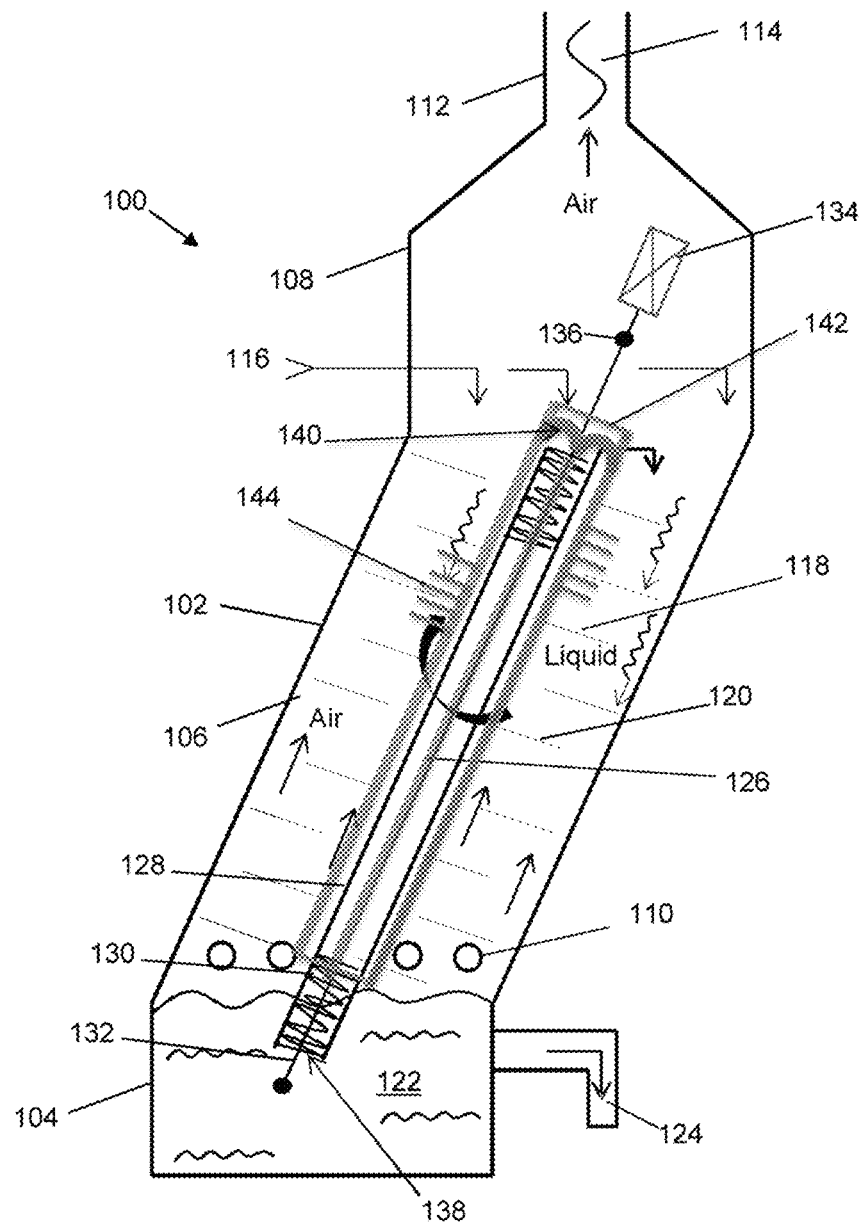
FIG. 1 shows a schematic diagram illustrating a humidity management device according to an example embodiment.

FIG. 1 shows a schematic diagram of a humidity management device 100 according to an example embodiment. The humidity management device 100 comprises a casing or chamber 102 having a lower section 104 (hereinafter interchangeably referred to as the first end 104), a middle section 106 and an upper section 108 (hereinafter interchangeably referred to as the second end 108). As shown in FIG. 1, the middle section 106 is tilted or inclined in relation to the lower section 104 and the upper section 106. However, it will be appreciated that there may be no tilting in alternate embodiments and the sections form a generally straight or upright chamber for example.

The casing 102 further includes one or more gas inlets 110 adjacent the lower section 104 and a gas outlet 112 at the top end of the upper section 108, where there can be assembled a ventilator 114 to produce a gas flow, typically an air flow, from the gas inlets 110 to the upper section 108 of the casing or chamber 102. The humidity management device 100 also includes one or more liquid inlets 116 adjacent the second end 108. In use, the one or more liquid inlets 116 receive a moisture-regulating substance in liquid form and dispense the moisture-regulating substance into the chamber 102 to interact with the air flow to thereby change a humidity level of the air before the air exits the chamber 102.

A brush 118 having a plurality of bristles 120 is disposed in the middle section 106 below the one or more liquid inlets 116, such that a moisture-regulating substance, e.g. a liquid, water or a water-based solution, that is dispensed from the one or more liquid inlets 116 can moisten the bristles 120 of the brush 118. The bristles 120 preferably are made of an elastic material and advantageously possess a porous surface. Additionally, the bristles 120 can be hollow to carry more of the moisture-regulating substance and effectively increase the transit time of the moisture-regulating substance in the chamber 102. As a result, the chamber 102 can be moistened in the middle section 106 with the introduced moisture-regulating substance and serves as a contact surface for the moisture-regulating substance. Under the effect of gravity, the moisture-regulating substance flows through the middle section 106, e.g. between bristles 120 or along an inner surface of the casing 102, and is collected at a reservoir 122 at the bottom of the casing 102 adjacent the lower section 104. In some implementations, the humidity management device 100 further includes an outlet 124 in fluid communication with the reservoir 122 for draining excess liquid from the reservoir 122.

As shown in FIG. 1, to improve or enhance the interaction between the moisture-regulating substance and the air flow, at least a portion of the moisture-regulating substance collected at the reservoir 122 is transported upward using a conveyor, and re-distributed to the space in the middle section 106, e.g. over the bristles 120 of the brush 118. Here, the conveyor is in the form of an Archimedes' screw 126 which runs parallel to the axis of the middle section 106. The Archimedes' screw 126 comprises a tube 128 containing a loop 130 and a drive axle 132, which is driven by an actuator in the form of a motor 134 and which is pivot-mounted to bearing 136. Through the axle 132, the loop 130 is rotatable. One end 138 of the tube 128 is in fluid communication with the reservoir 122 while the rest of the tube 128 including the opposite end 140 of the tube 128 is enclosed by an elongated sleeve 142. When the motor 134 is powered, it can rotate the loop 130 to transport a portion of the moisture-regulating substance from the reservoir 122 to the opposite end 140 of the tube 128 where the moisture-regulating substance flows into an interior space of the elongated sleeve 142.

In the example embodiments, the elongated sleeve 142 helps to re-distribute the moisture-regulating substance to the space in the middle section 106 more effectively. For example, the elongated sleeve 142 has a cylindrical radial surface which has a plurality of holes through which a liquid can exit as the sleeve 142 is rotated by the motor 134. In a preferred implementation, a plurality of hollow tubes 144 are connected to the holes, with each tube being attached to a corresponding hole, such that the tubes 144 are in fluid communication with the interior space of the sleeve 142. The hollow tubes 144 are typically made of a polymeric material and include a porous surface capable of carrying the moisture-regulating substance. As a result, the moisture-regulating substance may be re-distributed as a liquid film on the porous surface. Alternatively or in addition, the moisture-regulating substance may be re-distributed as a mist from the porous surface into the space of the middle section 106 where the moisture-regulating substance may collect on the bristles 120 of the brush 118.

With reference to FIG. 1, the operation of the humidity management device 100 is now described. Typically, a moisture-regulating substance in liquid form is introduced into the chamber 102 via the one or more first liquid inlets 116. Moreover, within the chamber 102, the liquid which is collected in the lower section 104, is lifted by using the Archimedes' screw 126 and is conveyed to the elongated sleeve 142 enclosing at least part of the Archimedes' screw 126. The sleeve 142 re-distributes the liquid to the space in the middle section 106, and the liquid is moved by gravity back to the lower section 104 of the chamber 102. Because of the rotational motion of the Archimedes' screw, the brush 118, sleeve 142 and hollow tubes 144 connected thereto are simultaneously put into motion. Additionally, because of the ventilator 114 and gas inlets 110, an air flow is produced from gas inlets 110 to the upper section 108.

The surfaces of the individual bristles 120 of the brush 118 and the surfaces of the hollow tubes 144 are moistened by the liquid moisture-regulating substance, thus providing ample opportunity for the air flow to come into contact with the moisture regulating substance. The sleeve 142 helps to re-distribute the moisture-regulating substance more effectively since the liquid pressure inside the sleeve 142 is substantially uniform. In other words, the sleeve 142 works to re-distributes the moisture-regulating substance over its entire length, thus providing a more efficient re-use of the liquid collected at the reservoir 122. During rotation of the brush 118 and the sleeve 142, a fine droplet mist of the moisture-regulating substance can be created to provide an additional contact surface for the liquid. In other words, the interaction between the air flow and the liquid can be more thorough. The moisture-regulating substance which has contacted the air flow, flows back through gravity into the reservoir 122 at the lower section 104 of the chamber 102 and can be discharged via outlet 124.

When using humidity management device 100 as described above to dehumidify or humidify air, the interaction between the air flow and the liquid moisture-regulating substance can be further enhanced by introducing a temperature difference between the air flow and the liquid. For example, to promote the removal of moisture from the air flow, the input air flow can be heated while the liquid can be cooled. Conversely, to promote the evaporation and release of water from the liquid into the air flow, the liquid can be heated while the input air flow can be cooled.

The humidity management device 100 of FIG. 1 can be configured to operate as a dehumidification unit of an air-conditioning system. In such application, the gas being supplied to the gas inlets 110 is typically humid input air, while the liquid moisture-regulating substance supplied to inlets 116 is a moisture-low adsorbent or absorbent. Through contact between the humid air and the liquid in the chamber 102, moisture is removed from the input air such that output air exiting the ventilator 114 has a humidity level lower than that of the input air. Preferably, the temperature of the input air is higher than the temperature of the liquid, and the output air may be partially cooled as a result of it contacting the liquid sorbent. The moisture-high liquid collected at the reservoir 122 at the lower section 104 can be discharged or recycled after reprocessing.

Conversely, the humidity management device 100 of FIG. 1 can also be configured to operate as a humidification unit of an air-conditioning system. In such application, the gas being supplied to the gas inlets 110 is typically dry input air, while the liquid moisture-regulating substance supplied to inlets 116 can be water or a water-carrying liquid. Through contact between the dry air and the liquid in the chamber 102, moisture is removed from liquid and released into the air flow such that output air exiting the ventilator 114 has a humidity level higher than that of the input air. Preferably, the temperature of the input air is lower than the temperature of the liquid to promote evaporation and release of water from the liquid into the air.

The humidity management device 100 of FIG. 1 can further be configured to operate as an evaporator unit to extract water from a water-carrying liquid. Such application is similar to the humidification unit described above; however, output air from the evaporator unit is typically used to generate water instead of being provided a room or place of comfort. Here, the water-carrying liquid is supplied to the liquid inlets 116 and, by passing the chamber 102, comes into contact with the dry input air. Water is removed, e.g. evaporated, from the liquid such that output air exiting the evaporator unit is relatively saturated with water vapour. The output air can then be channeled past a condenser where water is separated and collected for use.

Figure 2:
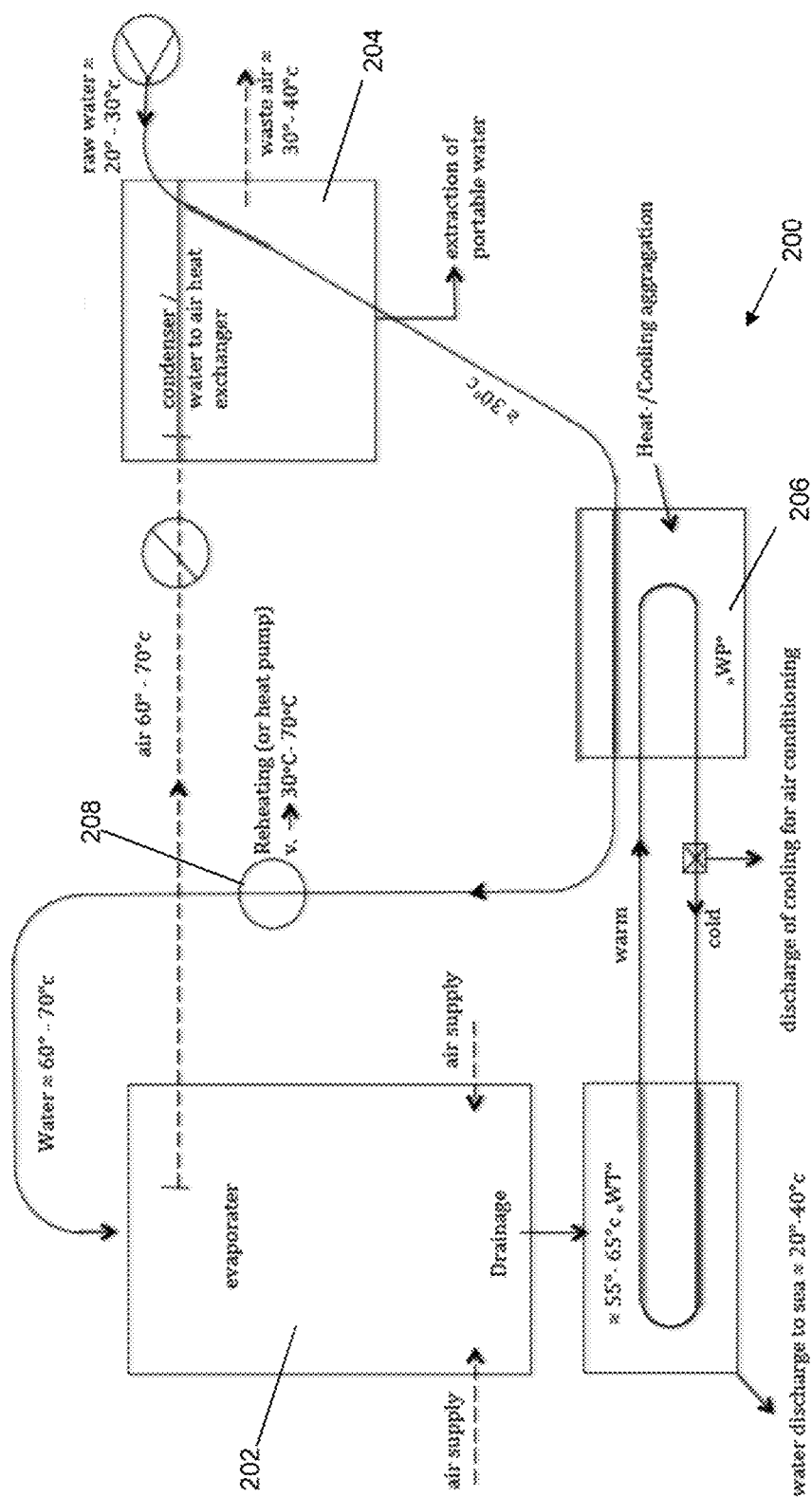
FIG. 2 shows a schematic diagram illustrating a system for generating potable water according to an example embodiment.

FIG. 2 shows a schematic diagram illustrating a system 200 for generating potable water from raw water and employing such an evaporator unit according to an example embodiment. The raw water, such as brackish water or saltwater, may be provided through use of a pump, and may have a temperature in the range of about 20-30° C. Typically, the raw water is provided to an evaporator unit 202, similar to one as described above, while input air having a first humidity level is also provided to the same evaporator unit 202 but is directed to flow in opposite direction to the flow of the raw water. For example, the inlet for the raw water is positioned above the inlet for the input air. The input air is directed to contact the raw water in the manner as describe above and become moistened such that output air exiting the evaporator unit 202 has a second humidity level higher than the first humidity level. In other words, the output air becomes substantially saturated with the water vapour from the raw water, while salt molecules and other impurities stay in the water and the waste water is discharged. The output air is then directed from the evaporator unit 202 to a condenser unit 204 to condense water molecules from the output air, to thereby generate potable water. The potable water is collected for use while the waste air is expelled to the environment.

For example, the condenser unit 204 may be a fixed-bed condenser equipped with fixed-bed-condensation seed, on which the water molecules condense from the air. Further, to accelerate the condensation process, the condenser unit 204 may have a pressurized chamber (not shown) that provides an overpressure.

To improve energy efficiency, in the example embodiments, the raw water may be heated to a temperature higher than that of the input air in multiple steps. First, the raw water is conducted through the condenser unit 204, without becoming into physical contact with the moistened air undergoing condensation, to be pre-heated to a temperature of about 30° C. or higher. Next, the raw water undergoes a heat exchange at a heat exchanger 206 with the waste water that is drained from the evaporator unit 202, to achieve a temperature in the range of 30-70° C. Further, heating means in the form of a heater or heat pump 208 is used to further heat the raw water to an operating temperate of approximately 60-70° C. before the raw water is provided to the evaporator unit 202. The heat pump 208 may utilise heat recovered from other systems for this purpose.

As described, the system 200 maximises use of the heating/cooling capacities that are available such that the energy requirement may be reduced. Moreover, the waste water that is discharge to the environment, e.g. back to the sea, is at a reduced temperature of about 20-40° C. that may not adversely impact the ecosystem.

Figure 3:
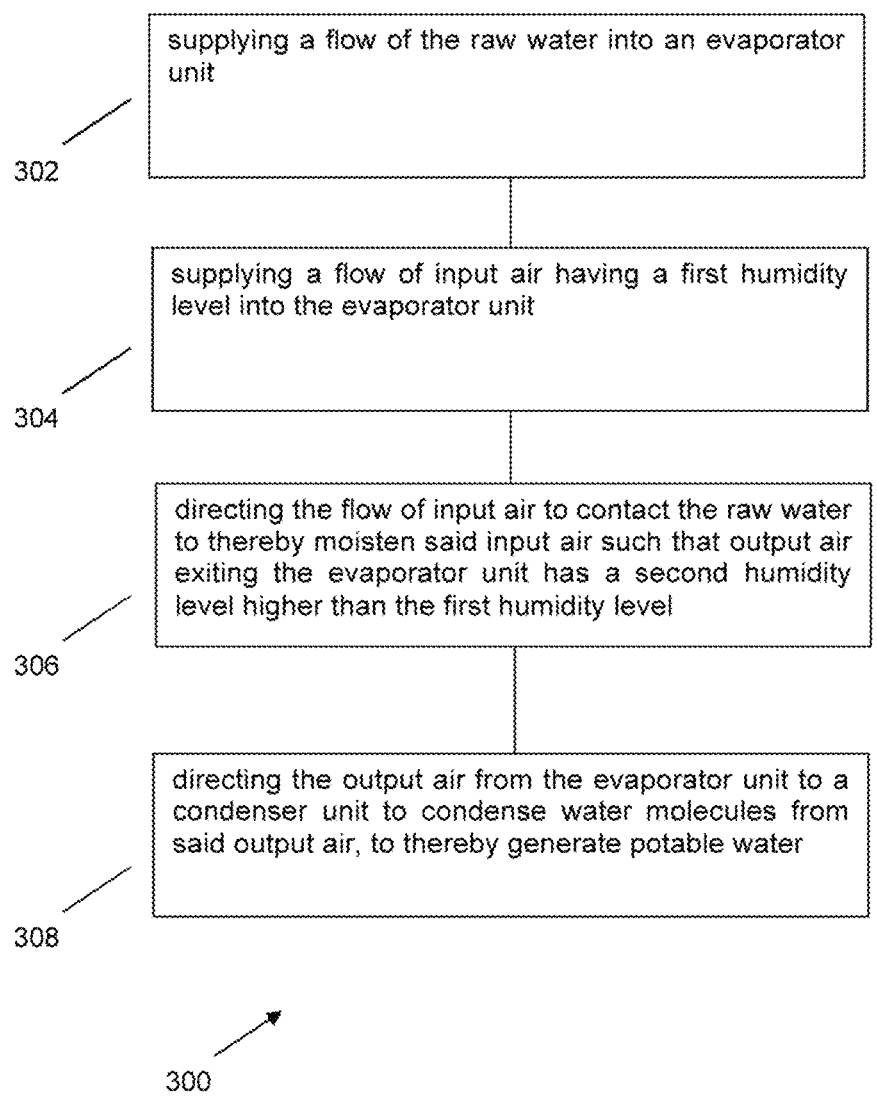
FIG. 3 shows a flow chart illustrating a method for generating potable water from raw water according to an example embodiment.

FIG. 3 shows a flow chart 300 illustrating a method for generating potable water from raw water according to an example embodiment. At step 302, a flow of the raw water is supplied into an evaporator unit as described above with reference to FIG. 1. At step 304, a flow of input air having a first humidity level is supplied into the evaporator unit. At step 306, the flow of input air is directed to contact the raw water to thereby moisten said input air such that output air exiting the evaporator unit has a second humidity level higher than the first humidity level. At step 308, the output air from the evaporator unit is directed to a condenser unit to condense water molecules from said output air, to thereby generate potable water.

It will be appreciated by a person skilled in the art that numerous variations and/or modifications may be made to the present invention as shown in the specific embodiments without departing from the spirit or scope of the invention as broadly described. The present embodiments are, therefore, to be considered in all respects to be illustrative and not restrictive.

The invention claimed is:

1. A potable water generation system comprising:
an evaporator unit; and
a condenser unit in fluid communication with the evaporator unit,
wherein the evaporator unit comprises a chamber having an air inlet disposed adjacent a first end and an air outlet disposed adjacent a second end, and a dispensing mechanism configured to dispense raw water into a space between the first and second ends, the dispensing mechanism comprising:
a liquid inlet disposed adjacent the second end for supplying a flow of the raw water into the chamber toward the first end; and
a conveyor configured to transport a portion of the raw water collected adjacent the first end and re-distribute said raw water into the space between the first and second ends, the conveyor at least partially enclosed in an elongated sleeve;
wherein the air inlet is configured to receive a flow of input air having a first humidity level;
wherein the air outlet is configured to draw said input air to contact the raw water to thereby moisten said input air such that output air exiting the chamber has a second humidity level higher than the first humidity level;
wherein the condenser unit is configured to receive the output air from the evaporator unit and condense water molecules from said output air, to thereby generate potable water;
wherein the condenser unit is further configured to pre-heat cool incoming raw water using the output air from the evaporator unit; and
wherein the potable water generation system further comprises a heat exchanger configured to receive the incoming raw water from the condenser unit and to further pre-heat the incoming raw water using warm raw water from the evaporator.

2. The system as claimed in claim 1, wherein the condenser comprises a fixed-bed condenser.

3. The system as claimed in claim 1, wherein the condenser comprises a pressurized chamber.

4. The system as claimed in claim 1, further comprising a heater disposed downstream of the heat exchanger and configured to further heat the incoming raw water to a predetermined working temperature prior to the raw water entering the chamber of the evaporator unit.

5. The system as claimed in claim 4, wherein the working temperature is in the range of between 50° C. and 70° C.

6. The system as claimed in claim 1, wherein the conveyor comprises an Archimedes' screw.

7. A method for generating potable water from raw water, the method comprising the steps of:
supplying a flow of the raw water into an evaporator unit, the evaporator unit comprising:
a chamber having an air inlet disposed adjacent a first end and an air outlet disposed adjacent a second end; and
a dispensing mechanism configured to dispense a moisture-regulating substance into a space between the first and second ends, the dispensing mechanism comprising:
a liquid inlet disposed adjacent the second end for supplying a flow of the moisture-regulating substance into the chamber toward the first end; and
a conveyor configured to transport a portion of the moisture-regulating substance collected adjacent the first end and re-distribute said moisture-regulating substance into the space between the first and second ends, the conveyor at least partially enclosed in an elongated sleeve;
wherein the air inlet is configured to receive a flow of input air having a first humidity level; and
wherein the air outlet is configured to draw said input air to contact the moisture-regulating substance to thereby change a moisture content of said input air such that output air exiting the chamber has a second humidity level different from the first humidity level;
supplying a flow of input air having a first humidity level into the evaporator unit;
directing the flow of input air to contact the raw water to thereby moisten said input air such that output air exiting the evaporator unit has a second humidity level higher than the first humidity level; and
directing the output air from the evaporator unit to a condenser unit to condense water molecules from said output air, to thereby generate potable water;
wherein the condenser unit is further configured to pre-heat cool incoming raw water using the output air from the evaporator unit; and
wherein a heat exchanger is configured to receive the incoming raw water from the condenser unit and to further pre-heat the incoming raw water using warm raw water from the evaporator.

8. The method as claimed in claim 7, wherein supplying the flow of the raw water into the evaporator unit comprises pre-heating the raw water through heat exchange at the condenser unit with the output air from the evaporator unit and/or at a heat exchanger with warm raw water from the evaporator unit.

9. The method as claimed in claim 7, wherein the conveyor comprises an Archimedes' screw.

* * * * *